(No Model.)

H. W. CADOTT & C. C. CREWSON.
HOSE COUPLING FOR AIR BRAKES, &c.

No. 579,291. Patented Mar. 23, 1897.

WITNESSES.
J. C. Medear.
J. A. Holt.

INVENTORS.
Henry W. Cadott.
Charles C. Crewson.
By Charles C. Crewson, Atty.

UNITED STATES PATENT OFFICE.

HENRY W. CADOTT AND CHARLES C. CREWSON, OF HORTON, KANSAS.

HOSE-COUPLING FOR AIR-BRAKES, &c.

SPECIFICATION forming part of Letters Patent No. 579,291, dated March 23, 1897.

Application filed September 21, 1896. Serial No. 606,523. (No model.)

*To all whom it may concern:*

Be it known that we, HENRY W. CADOTT and CHARLES C. CREWSON, citizens of the United States of America, residing at Horton, in the county of Brown and State of Kansas, have invented certain new and useful Improvements in Hose-Couplings, of which the following is a specification, reference being had therein to the accompanying drawings, and to the figures of reference marked thereon, forming a part of this specification, in which—

Figure 1:
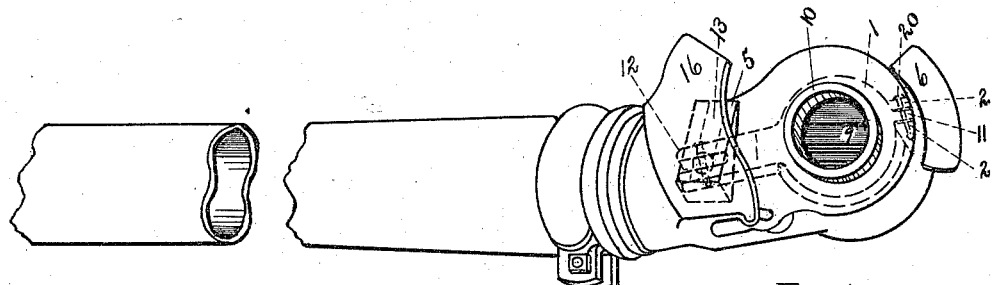
Figure 2:
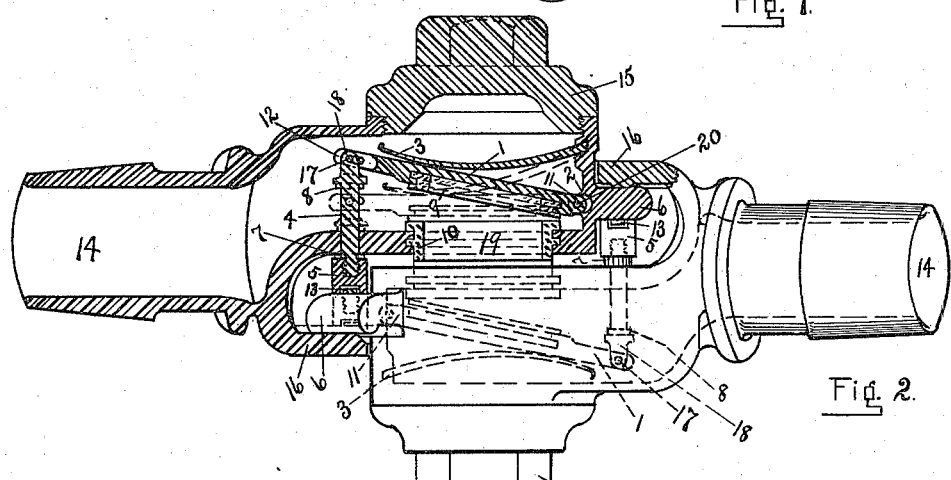
Figure 3:
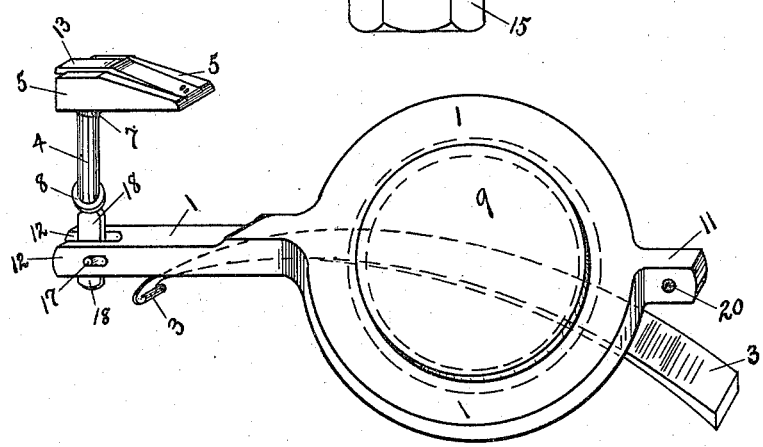

Figure 1 is a perspective view of one-half the coupling, showing by dotted lines the valve and wedge-shaped operating-block. Fig. 2 is a detailed perspective view of the coupling, showing two halves coupled together, also having a portion broken away to show the interior mechanism. Fig. 3 is a perspective view of the valve, showing the leaf-spring for closing said valve and the wedge-shaped operating-block and stem.

Referring to the drawings, 1 represents the valve with its lug 11 and jaws 12, hinged by two parallel extending ears 2 and secured thereto by means of a pivot-pin 20, and the jaws 12 secured to the stem-shank 18 by means of a pivot-pin 17 and operated by the stem 4, carrying a wedge-shaped block 5. The lip 6 engages the block 5 when coupling and forces valve 1 from its seat, opening a passage between gaskets 9 and 10.

2 represents the two parallel extending ears secured to the wall of coupling.

3 represents the leaf-spring secured to the wall of coupling and bearing against the valve 1 for the purpose of keeping the valve 1 closed when uncoupled.

7 and 8 represent gaskets placed around the stem 4 for the purpose of preventing air escaping.

13 represents a leaf-spring fastened to the wedge-shaped block 5 in Figs. 1, 2, and 3 to compensate for wear and the variation of the lip 6.

14 represents an air-passage.

15 represents a threaded plug for the purpose of gaining access to interior of coupling.

16 represents the cap attached to coupling for retaining lip 6 in a rigid position.

18 represents the shank to stem 4.

19 represents mouth of coupling.

Having thus described our invention, what we claim as new, and desire to secure by Letters Patent, is as follows:

1. A hose-coupling provided with the valve 1 pivoted at one end to the ears 2 and engaged at its opposite end by the shank 18 of the stem 4 and bearing against the spring 3 and operated by the wedge-shaped block 5, substantially as and for the purpose set forth.

2. A hose-coupling provided with the valve 1 and the mechanism consisting of the spring 3, shank 18, stem 4, and wedge-shaped block 5, connected together by the pivot 17, substantially as and for the purpose set forth.

In testimony whereof we affix our signatures in presence of two witnesses.

HENRY W. CADOTT.
CHARLES C. CREWSON.

Witnesses:
WM. MCNARY,
W. H. KEMPER.